United States Patent Office 3,337,744
Patented Aug. 22, 1967

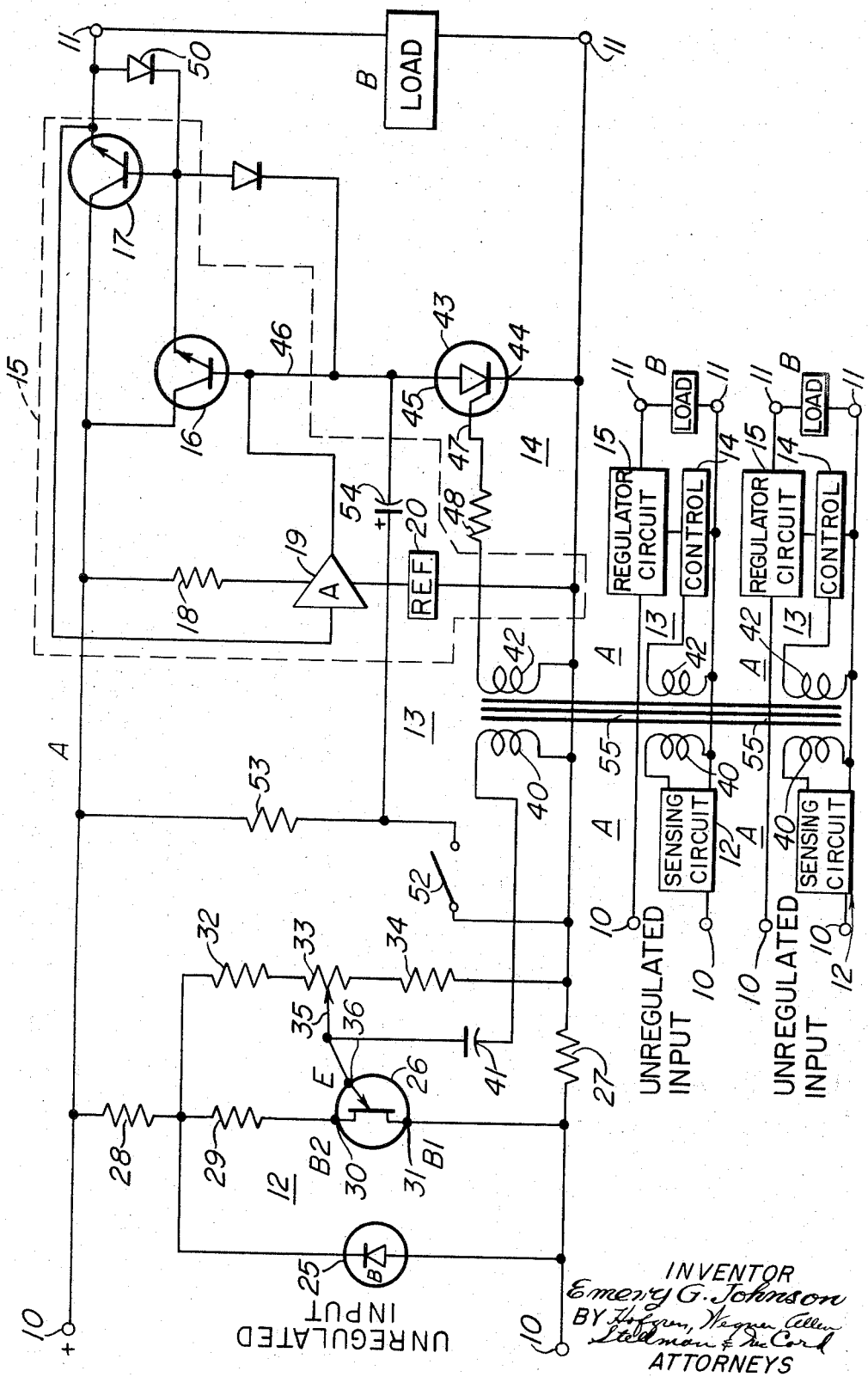

3,337,744
POWER SUPPLY WITH OVERLOAD AND UNDER-VOLTAGE PROTECTION CIRCUIT
Emery G. Johnson, Anaheim, Calif., assignor, by mesne assignments, to HLF Corporation, Chicago, Ill., a corporation of California
Filed June 1, 1964, Ser. No. 371,672
10 Claims. (Cl. 307—86)

ABSTRACT OF THE DISCLOSURE

A protection circuit simultaneously disables a number of series voltage regulated power supplies when an overload or undervoltage condition is sensed at any single power supply. A transformer has a core common to the individual protection circuits for each power supply, to simultaneously fire SCR's at each series regulator and open circuit the current path to the loads. The SCR's also provide a discharge path for energy from the loads.

---

This invention is concerned with a power supply, and more particularly with a protective circuit for overload or undervoltage conditions in a power supply.

In a voltage regulated power supply for supplying a regulated output voltage from an unregulated input voltage, it is desirable to incorporate a protective circuit capable of sensing an overcurrent condition at the output and reacting to shut off the supply rapidly. An overload current, due, for example, to a decrease in load impedance, could damage not only the components in the load circuit but additionally the components in the power supply. Component damage in the power supply is especially probable when the circuit contains semiconductors, which are easily damaged by excessive current.

Many circuits have several portions each connected with a different power supply. Accidental short circuiting of a part of the load circuit would in prior art arrangements result in shutting down only the power supply connected to the part of the circuit where the overload condition occurred. The voltages from the other power supplies might damage part of the load circuit, especially when that load circuit contained semiconductors. Furthermore, previous protective circuits, such as those containing fuses or circuit breakers, were unable to react quickly enough to an overload condition to provide complete protection for the power supply and load components.

A principal object of this invention is to provide an improved protective circuit for power supplies that will react to undesirable conditions to protect fully both the load circuit components and the power supply components of one or more loads and one or more power supplies.

Another object of this invention is to provide power supplies which are protectively interconnected so an overload condition in the output of any one will shut off the outputs of all power supplies.

One feature of the invention is the provision of a circuit that will sense an overload condition and thereby remove the output voltage in an extremely short amount of time sufficient to protect not only the load circuit but additionally the power supply components themselves.

Another feature is that multiple power supply units can be controlled by a protective power supply control.

Yet another feature is that the response time necessary to sense an overload condition and react accordingly is essentially the same for all power supply units.

A further feature is the provision that all power supplies providing various operating voltages for the load need not be in the same physical unit but may be protectively interconnected.

Yet a further feature is that the protective circuit will begin to divert current from the load as soon as the protective circuit begins to react to an overload condition.

And another feature is that the protective circuit will react to shut down the power supply output when the input voltage falls below a preset value, thus precluding problems which might arise from loss of regulation.

Further features and advantages will readily be apparent from the following specification and from the drawing which is a schematic illustration of an embodiment of the invention.

The drawing shows a plurality of power supply units A each connected through their input terminals 10, to a source of unregulated voltage, the magnitude of which may be different for each unit. The protected and regulated output from output terminals 11, 11 is applied to a load circuit B. Sensing means 12 produces a pulse output when the load current exceeds a predetermined level or the unregulated input voltage falls below a preset value. Transformer 13 couples this pulse to control circuit 14 which interrupts the current fed to the load through regulator circuit 15. Transformer 13 couples a pulse from any sensing circuit 12 to all control circuits 14 so that all outputs 11, 11 will be shut off due to an overload or low unregulated input present in any one or more power supply units.

The regulator circuit 15 is comprised of transistors 16 and 17, resistor 18, amplifier 19, and a source of reference voltage 20, such as a Zener diode. The regulator circuit shown is a typical semiconductor series regulator circuit, well known in the art. The protective circuit described in this specification may be applied to any one or any number of these regulator circuits which are well known and form no part of the invention described. For purposes of completeness, the operation of this regulator circuit will be briefly described. Series transistor 17 acts as a variable regulating element in series with the load. Regulation occurs as a result of the voltage drop across this series transistor. The voltage amplifier 19 lowers the resultant output resistance by a factor approximately equal to one divided by the voltage gain. The regulator circuit 15 could, of course, operate with one or more semiconductors and amplifier 19 is not necessary to the operation of all series voltage regulators.

The operation of sensing circuit 12, control circuit 14 and coupling means 13 will now be described. Sensing means 12 comprises Zener diode 25, unijunction transistor 26, current sensing resistor 27, and associated circuitry. Zener diode 25 is connected in series with resistor 28 across the unregulated input. The voltage drop across Zener diode 25 forms a stable source of reference voltage for transistor 26. Temperature compensating resistor 29 is connected in series with the second base 30 and the first base 31 of unijunction transistor 26 across the bias supply, i.e., Zener diode 25. Series resistors 32, 33 and 34 across the bias supply comprise a voltage divider network fixing through variable arm 35 of resistor 33 the emitter 36 to base 30 to base 31 voltages of unijunction transistor 26. Sensing resistor 27 is coupled across base 31 and emitter 36 of unijunction transistor 26 by primary winding 40 of transformer 13 and capacitor 41. Sensing resistor 27, which may be a fractional ohm resistor, is also in series between the unregulated input terminal 10 and regulated output terminal 11. Tap 35 of resistor 33 is adjusted so that with maximum desirable load current flowing, unijunction transistor 26 will be just in the non-conducting state. The non-conducting state results when the total external reference voltage at emitter 36 is just slightly below the internal voltage at the emitter junction, as is well known in the art. Capacitor 41, connected across unijunction transistor 26 through sensing resistor 27 and primary winding 40 is charged to approximately the static voltage between emitter 36 and base one 31.

In the event of an increased load current above the preset maximum, caused, for example, by a reduction in load impedance, the current through sensing resistor 27 will increase, causing an increased voltage between emitter 36 and base one 31 which will switch unijunction transistor 26 to the conducting state.

The transition to the conducting state caused by the increase in the reference voltage of emitter 36 reduces the emitter-base one impedance of unijunction transistor 26 to a very low value, providing a discharge path for capacitor 41. The resultant discharge of capacitor 41 through the primary 40 of pulse transformer 13 induces a pulse in the secondary 42 which is connected to the control circuit 14.

In the control circuit a silicon controlled rectifier (SCR) 43 has its cathode 44 connected to one terminal 11 of the regulated output circuit and its anode 45 connected to one terminal 46 of the regulator circuit, here the base of transistor 16. The gate 47 of SCR 43 is connected in series with resistor 48 across the secondary winding 42 of pulse transformer 13.

The voltage pulse coupled to secondary winding 42 of pulse transformer 13 due to conduction of unijunction transistor 26 is coupled through resistor 48 to gate 47 of SCR 43, causing the SCR to conduct. The voltage at the base of transistor 16 in the regulator circuit 15 is therefore reduced to the intrinsic drop of SCR 43, typically 1.5 volts. This drop in base voltage in turn drives transistor 17 toward cut-off, thereby reducing the regulated output to zero.

Diodes 50 and 51 are connected in series between the regulated output terminal 11 and SCR 43. The load circuit may store energy due to the presence of elements like inductors or capacitors. These diodes 50 and 51 provide a path for the dissipation of this energy in the load while transistors 16 and 17 are shutting off. The total time involved from the initiation of the overload condition until the regulated output has dropped to 10 percent of nominal is in the order of 75 microseconds for a 6 volt supply. The time is predominately a result of the inherent drop of SCR 43 being appreciable compared to the output. For a 24 volt supply, where the drop in SCR 43 is small compared to the output, the total time is in the order of 20 microseconds. This extremely high speed reaction to an overload condition will protect the semiconductors in the regulator circuit. The regulated output will remain at zero until SCR 43 is returned to the non-conducting state. This is accomplished by reset switch 52 connected to the junction of resistor 53 and capacitor 54. Capacitor 54 will charge to the polarity shown on the drawing when SCR 44 is conducting. When reset switch 52 is closed the positive potential from capacitor 54 is connected to the cathode 44 of SCR 43. Since the cathode is now more positive than the anode, SCR 43 returns to the non-conducting state in turn restoring the amplifier and regulated output to normal condition.

By proper choice of resistor 28 the protective circuit may be made to respond when the unregulated input voltage drops below any preset value. This will occur because the internal voltage drop at the emitter of unijunction transistor 26 will fall below the external reference voltage at the emitter 36 which is fixed in value by the bias source 25. In this manner the supply may be shut off completetly if low line unregulated input voltage occurs, thereby precluding problems arising in the load from loss of regulation.

Other power supplies incorporating the above described circuits may all be protectively interconnected by the use of multiple primaries and secondaries on pulse transformer 13 such that a shut down of any one supply will shut all down simultaneously. As shown, each power supply has an unregulated input and a regulated output. When an overload condition occurs, a pulse will be sent to primary winding 40 from the sensing circuit 12 in a manner as heretofore described. All primary windings 40 of pulse transformer 13 are coupled to all secondary windings 42 through the common core 55. Each secondary winding 42 is coupled to its respective control circuit 14 which is connected in series with the regulator circuit 15 across the load, as previously described. An overload condition sensed by any of the protective circuits will result in a pulse fed by pulse transformer 13 to each of the control circuits 14 of each power supply so that all regulated output voltages will be removed from the load before damage can occur. Of course, various modifications could be made in the protectively interconnected power supplies. For example, if desired, certain power supplies could be protectively connected to only their own respective load by the use of individual coupling means, or they could be protectively interconnected in any desired pattern.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a power supply, a plurality of power supply units, each unit having an input connected with a source of unregulated voltage, a regulator circuit having an output connected with a load, a control circuit for interrupting current through the regulator to the load, means for sensing an electrical condition of the load, means responsive to an undesirable electrical condition for actuating said control circuit, said sensing means and said actuating means for each unit being transformer coupled, each transformer having primary and secondary windings, and a common core for said transformer windings for interconnecting the actuating means for each unit.

2. The power supply of claim 1 wherein said electrical condition is current to the load, said actuating means being responsive to load current in excess of a predetermined level, and said actuating means includes a unijunction diode having an emitter circuit connected with said current sensing means to conduct when said current exceeds a predetermined minimum and a capacitor connected between said emitter and the associated primary winding of the coupling transformer.

3. The power supply of claim 1 wherein said control circuit includes a controlled rectifier connected across the output of said regulating circuit and a control element connected with the secondary winding of said transformer.

4. In a power supply, a plurality of units each unit including an input connected with the source of unregulated voltage, a voltage regulator circuit having an output connected with a load, a controlled rectifier connected across the output of said regulator, a unijunction transistor having base elements connected with a bias circuit and an emitter element connected with means for sensing current to said load, said unijunction transistor conducting when said current exceeds a predetermined minimum, a control signal transformer having a primary winding connected through a capacitor with the emitter of said unijunction transistor and a secondary winding connected with a control element of said rectifier, and a common core for the transformers of each of said units.

5. In a regulated power supply, a source of unregulated voltage, a regulator transistor having an emitter-collector circuit connected in series between the unregulated source and the power supply load, a controlled rectifier connected with the base of said transistor and across said load, means connected with the control element of said controlled rectifier for rendering said rectifier conductive, and a reset circuit for said controlled rectifier including a capacitor connected to be charged from said unregulated source and a switch operable to connect said capacitor with said controlled rectifier to render it nonconductive.

6. In a regulated power supply, a source of unregulated voltage, a regulator connected in series between the unregulated source and the power supply load, a unijunction transistor having two base elements and an emitter element; a source of bias connected with said base and emitter elements for establishing a nonconducting condition in said transistor; a resistor connected in series with the unregulated source, the regulator, and the load; a capacitor and said resistor connected with said emitter and base elements, said transistor conducting when the current through said resistor exceeds a predetermined minimum; and a control circuit connected with said capacitor for disabling said regulator when said transistor conducts.

7. The power supply of claim 6 wherein said bias supply includes a Zener diode connected across the unregulated voltage source.

8. In a regulated power supply, a source of unregulated voltage, a regulator connected in series between the unregulated source and one side of the power supply load, a controlled rectifier connected with the regulator and the opposite side of said load, means connected with the control element of said controlled rectifier for rendering said rectifier conductive and said regulator nonconductive, and diode means connected between said controlled rectifier and a junction between said regulator and said one side of the power supply load, said diode means being poled in the same direction as said controlled rectifier for dissipating energy in said load when said rectifier is rendered conductive.

9. In a power supply, a plurality of units each including a regulator circuit having an input connected with a source of unregulated voltage and an output connected with a load; a plurality of control circuits, each connected with a different regulator circuit and responsive to a signal for disabling the regulator circuit associated therewith to interrupt current through the regulator to the load; means responsive to an undesirable electrical condition of one of the regulator circuits for simultaneously generating a plurality of signals equal in number to the plurality of control circuits; and means connected to said generating means for coupling each signal to a different control circuit to simultaneosuly disable each regulator circuit.

10. The power supply of claim 9 wherein said generating means includes at least one unijunction transistor having two base elements and an emitter element, a source of bias connected with said base and emitter elements for establishing a nonconductive condition in said transistor, means responsive to an overload electrical condition for driving said unijunction transistor conductive to generate an activating signal, and means responsive to said activating signal for simultaneously generating said plurality of signals.

References Cited
UNITED STATES PATENTS

| | | | |
|---|---|---|---|
| 3,049,632 | 8/1962 | Staples | 307—88.5 |
| 3,146,392 | 8/1964 | Sylvan | 323—22 |
| 3,150,307 | 9/1964 | Kaeding. | |
| 3,177,417 | 4/1965 | Wright. | |
| 3,222,575 | 12/1965 | Dexter | 317—20 |
| 3,258,603 | 6/1966 | Wright | 307—94 X |
| 3,261,980 | 7/1966 | McCartney | 323—9 X |

ORIS L. RADER, *Primary Examiner.*

T. J. MADDEN, *Assistant Examiner.*